April 8, 1947.  P. M. HALL  2,418,767
ELECTRODE TRIMMER
Filed Nov. 4, 1944
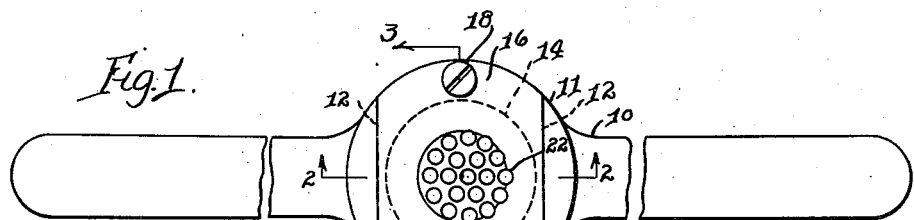
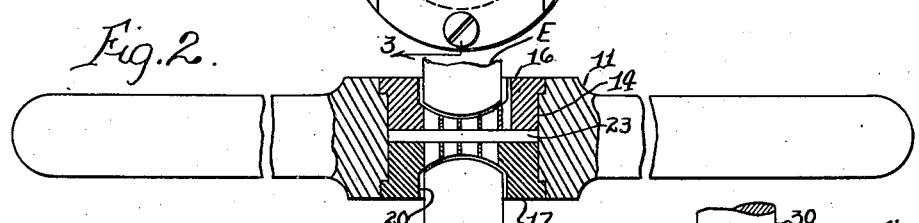
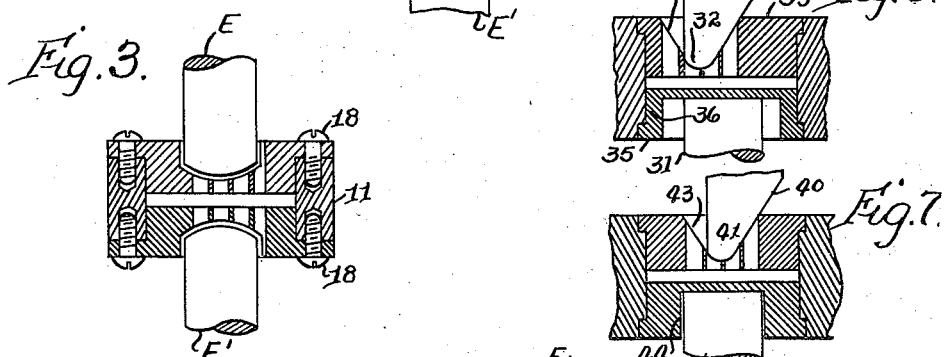
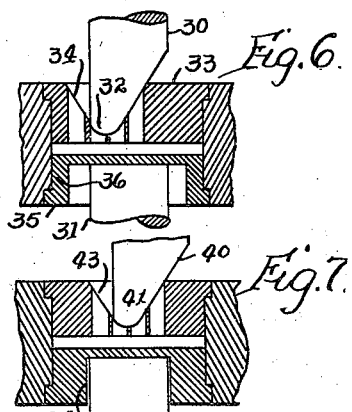
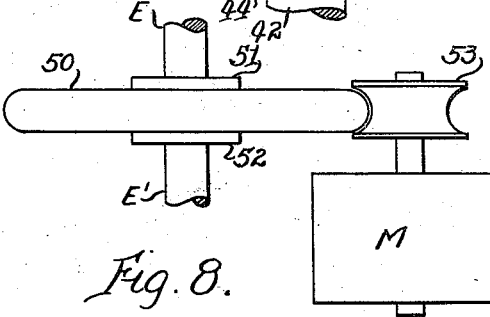
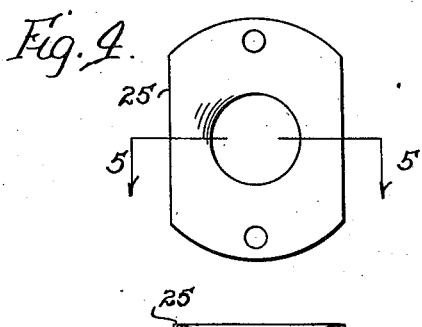
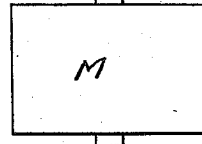
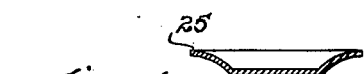
INVENTOR.
Preston M. Hall.
BY Chas. T. Hawley
ATTY.

Patented Apr. 8, 1947

2,418,767

UNITED STATES PATENT OFFICE 2,418,767

ELECTRODE TRIMMER

Preston M. Hall, Worcester, Mass.

Application November 4, 1944, Serial No. 562,005

3 Claims. (Cl. 90—12)

This invention relates to the art of electric welding and more particularly to electrodes of the type used in resistance spot-welding. Such electrodes are usually formed from heavy rods of copper or copper alloy and are rounded or pointed at their work-engaging ends. The shape or contour of said ends is varied in accordance with the work or the welding conditions.

As a result of use, these work-engaging ends become deformed or distorted and require redressing or trimming to restore their original shape or contour.

It is the general object of my invention to provide improved means for quickly and easily trimming or dressing such electrodes without removal thereof from the welding machine. A further object is to provide trimming means which may be readily adapted to produce electrode ends or points of any desired contour. I also provide an electrode trimmer which may be readily adapted to the trimming of an offset electrode.

My invention further relates to arrangements and combinations of parts which will be hereinafter described and more particularly pointed out in the appended claims.

Preferred forms of my invention are shown in the drawings, in which

Fig. 1 is a plan view of my improved electrode trimmer;

Fig. 2 is a side elevation thereof, partly in section along the line 2—2 in Fig. 1;

Fig. 3 is a transverse sectional elevation, taken along the line 3—3 in Fig. 1;

Fig. 4 is a plan view of a blank to be described;

Fig. 5 is a sectional elevation, taken along the line 5—5 in Fig. 4;

Fig. 6 is a sectional side elevation similar to Fig. 2 but showing my invention adapted to the trimming of an electrode with an offset point;

Fig. 7 is a sectional side elevation showing an additional construction for trimming an offset electrode; and Fig. 8 is a side elevation showing a power-driven form of my invention.

Referring to Figs. 1 to 3, my invention comprises a holder or frame 10 having an enlarged middle portion 11. The portion 11 is cut away between spaced parallel ledges 12 on each face thereof and also has a cylindrical recess 14 extending transversely through its middle portion. The holder 10 is preferably formed from a single piece of plastic or other electrically non-conducting material.

Trimmer plates 16 and 17 are provided, which plates have outer flanged portions fitting between the ledges 12 on the holder. The plates 16 and 17 also have inner cylindrical projecting portions fitting the cylindrical recess 14. The opposed plates may be held in operative position by screws 18 (Fig. 3), said screws extending into corresponding threaded openings in the middle portion 11 of the holder 10. The ledges 12 take most of the rotational strain.

It will be noted that the threaded openings in the holder do not extend entirely through the holder, and that the inner ends of the screws 18 are effectively and substantially spaced apart, so that they cannot engage each other and short-circuit the trimmer plates if current should accidentally be applied to the electrodes during a trimming operation.

Each trimmer plate 16 or 17 is provided with a recess 20 to receive the end of an electrode to be trimmed, and these recesses are contoured at their inner faces to the desired shape of the trimmed and finished electrode. Obviously, the exact contour of the recesses 20 will be varied in accordance with the shape of the electrode to be produced.

The trimmer plates are preferably of hardened steel. Small perforations 22 are cut through the trimmer plates in the portions aligned with the recesses 20, and the edges of these perforations constitute cutting edges to trim the electrodes.

It will be noted in Fig. 1 that no one of the perforations 22 is concentric with the axis of the recess 20, and consequently all points on the associated electrodes will be subjected to cutting action as the trimmer plates are rotated. It will be further noted that the inner ends of the plates 16 and 17 are separated by an insulating air space 23, which space also receives chips formed by the cutting or trimming action.

The use of the above described electrode trimmer will be readily understood. The electrodes are moved apart to permit insertion of the trimmer and are thereafter advanced under pressure to engage the trimmer plates. While this pressure is maintained, the electrode trimmer is manually rotated and the ends of the electrodes are trimmed to the contour of the recesses 20 in the particular trimmer plates selected for use.

If it is desired to trim one electrode only, or if one electrode requires further trimming after the associated electrode is in its desired shape, a blank 25 (Figs. 4 and 5) may be substituted for one of the trimmer plates 16 or 17. For this purpose, the trimmer plate may be removed and the blank 25 substituted therefor and similarly secured by the screws 18, or the blank may be inverted and placed loosely over the trimmer plate but without removing the plate from the holder.

For certain purposes, an electrode 30 (Fig. 6) is sometimes used which is aligned with the associated electrode 31 but which has its welding point 32 offset as shown. Such an electrode may be trimmed by providing an upper trimmer plate 33 having an offset contoured recess 34 and by providing a lower trimmer plate 35 having a recess 36 which is flat on its inner end face and which is of substantially greater diameter than the electrode 31. In this case the electrode trimmer will rotate about the point 32, while the lower plate 35 slides loosely laterally with respect to the lower electrode 31.

It is also customary under certain conditions to use an electrode 40 (Fig. 7) having its welding point 41 offset with respect to the electrode 40 but axially aligned with respect to the lower electrode 42. In this case the offset electrode may be trimmed by providing a contoured recess 43 which is aligned with a recess 44 which fits the lower electrode 42 and is centered thereby.

In Fig. 8 I have indicated that my improved electrode trimmer may be power-operated by providing an annular member 50 to support the trimmer plates 51 and 52 and by providing a motor M having a driving pulley 53 adapted to frictionally engage the rim 50. Under ordinary conditions, however, it is found that provision for manual operation is sufficient and satisfactory.

Having thus described my invention and the advantages thereof, I do not wish to be limited to the details herein disclosed, otherwise than as set forth in the claims, but what I claim is:

1. An electrode trimmer comprising a frame member, a pair of trimmer plates mounted in opposed and spaced relation in said frame member and having recessed and contoured outer faces, said plates being perforated to provide openings parallel with the electrodes to be trimmed and said openings providing cutting edges in said contoured faces, and means to rotate said frame member and plates in contact with a pair of aligned electrodes to be trimmed, said frame member being formed of electrically insulating material, separate fastening devices being provided in said frame member for each opposed plate, and all parts of said fastening devices for one plate being spaced and insulated from all parts of said fastening devices for the other plate, whereby said trimmer plates are electrically insulated from each other and any short circuit between the plates or the fastening devices or the aligned electrodes to be trimmed is avoided.

2. In an electrode trimmer, a frame member, a pair of trimmer plates mounted in axially spaced relation in said frame member, each plate having a recess of selected contour in its outer face and each having a plurality of closely adjacent cutting perforations extending through said plate in said recessed portion and axially of said plate and providing cutting edges at the recessed surface, and means to secure said plates in spaced relation in said frame member, said member having a transverse recess between said plates and connecting with said perforations and said recess providing chip storage space in said frame member.

3. In an electrode trimmer, a rotatable trimmer plate of substantial thickness and having flat upper and lower surfaces and having a contoured concave recess of revolution in one surface, with the axis of said recess perpendicular to the flat surfaces of said plates, and said plate having a plurality of closely adjacent and relatively small cylindrical passages extending through said plate in said recessed portion and parallel to the axis of said plate, said cylindrical passages providing cutting edges in the contoured concave surface of the recess, every cylindrical passage having its longitudinal axis out of alignment with the axis of the plate, and said cylindrical passages collectively providing cutting edges effectively redressing the whole surface of an electrode which is engaged by said contoured portion of said trimmer plate as said plate is rotated.

PRESTON M. HALL.

REFERENCES CITED

The following references are of record in the file of this patent:

UNITED STATES PATENTS

| Number | Name | Date |
| --- | --- | --- |
| 2,284,483 | Whitesell | May 26, 1942 |
| 2,286,931 | Radeke | June 16, 1942 |
| 1,729,881 | Lambert | Oct. 1, 1929 |
| 1,916,874 | Wilhelm | July 4, 1933 |